UNITED STATES PATENT OFFICE.

GRANVILLE M. NORWOOD, OF BEVERLY, MASSACHUSETTS.

IMPROVEMENT IN SOLUTIONS FOR CLEANING GOLD, SILVER, &c.

Specification forming part of Letters Patent No. 167,192, dated August 31, 1875; application filed July 9, 1875.

*To all whom it may concern:*

Be it known that I, GRANVILLE M. NORWOOD, of Beverly, in the county of Essex and State of Massachusetts, have invented certain new and useful Improvements in Solution for Cleaning Gold, Silver, &c.; and I do hereby declare that the following is a full, clear, and exact description thereof, which will enable others skilled in the art to which it pertains to make and use the same.

This invention relates to a new and useful solution for the purpose of cleaning articles of gold, silver, &c., as well as plated wares of any kind, and is composed of the following ingredients, in about the following quantities, to wit:

I dissolve in 6 (six) ounces of water 3 (three) drams of cyanide of potassium; to this I add 2 (two) ounces of ammonia-water and 8 (eight) ounces of ninety-five per cent. alcohol, and for the purpose of partially covering the strong smell of the ammonia I add 2 (two) drams of oil of sassafras or similar aromatic substance. With this solution I mix thoroughly 4 (four) ounces of precipitated chalk.

The solution is to be used in the same manner as other compounds—that is, after the mixture is shaken or agitated so that the chalk is thoroughly intermixed with it, I wet a piece of cloth, wash-leather, or suitable material with the mixture, and rub the ware that is to be cleaned, and in this manner with this mixture I am able to clean the ware very quickly, and, at the same time, impart to its surface a very brilliant and beautiful luster.

What I wish to secure by Letters Patent and claim is—

The herein-described solution for cleaning gold, silver, &c., formed of water, cyanide of potassium, ammonia-water, alcohol, oil of sassafras, or similar aromatic substance, and precipitated chalk, substantially in the proportions set forth.

In testimony that I claim the foregoing as my own invention I affix my signature in presence of two witnesses.

GRANVILLE M. NORWOOD.

Witnesses:
ALBAN ANDRÉN,
F. ALLEN.